JEAN F. LOUIS
INVENTOR.

United States Patent Office 3,487,240
Patented Dec. 30, 1969

3,487,240
CLOSED CYCLE MAGNETOHYDRODYNAMIC GENERATOR
Jean F. Louis, Boston, Mass., assignor to Avco Corporation, Cincinnati, Ohio, a corporation of Delaware
Filed Feb. 9, 1966, Ser. No. 526,199
Int. Cl. G21d 7/02
U.S. Cl. 310—11                              7 Claims

ABSTRACT OF THE DISCLOSURE

A method of and apparatus for magnetohydrodynamically generating electrical power wherein an inert gas containing a seeding material and a reactant which functions to ionize the seeding material by exothermic reaction is passed through an MHD generator. The molar concentration of the seeding material is small compared to that of the inert gas and is ionizable at relatively low temperatures.

---

The present invention relates to energy conversion apparatus, and more particularly to closed cycle magnetohydrodynamic energy conversion apparatus.

In general terms, MHD generators produce electrical power by movement of electrically conductive fluid relative to a magnetic field. The fluid employed is usually an electrically conductive gas from a high temperature, high pressure source. From the source, the fluid flows through the generator and, by virtue of its movement relative to the magnetic field, induces an electromotive force between opposed electrodes within the generator. In open cycle systems, the gas may exhaust to a sink, which may simply be the atmosphere; or, in closed cycle systems, the gas may exhaust to a recovery system including pumping means for returning the gas to the source.

Several different gases may be used; the gas may simply be air, or may comprise inert gases, such as helium or argon. In open systems, i.e., those in which the gases are not recovered after passing through the power plant, air is normally used. In closed systems in which the gases are recovered and recirculated, it is feasible to use relatively expensive gases, such as helium and argon. To promote electrical conductivity, the gases may be heated to high temperature; conductivity may also be increased by the addition to the gases of a substance that ionizes readily at the operating temperature of the gas. Regardless of the gas used, it comprises a mixture of electrons, positive ions and neutral atoms, which, for convenience, may be termed "plasma."

Before discussing MHD generation according to the principles of this invention, it will be useful to review some pertinent physical properties of gaseous fluids; the conditions under which they become conducting; and the manner in which this conductive condition may be achieved to facilitate interaction with a magnetic field. The basic properties of pure gases or of gas mixtures, such as air, are such that under normal circumstances of temperature and pressure, the conductivity of the gas is so low that for all practical purposes the gas is non-conducting and no interaction with a magnetic field is possible. To achieve any significant result, the conductivity of the gaseous fluid must be increased in some manner. The preferred method of enhancing the gas conductivity is by partially ionizing the gas, causing a fraction of the gas molecules to lose one or more electrons. The resulting charged particles are free to drift through the gas and may give rise to current conduction by interaction with a magnetic field.

The gas may be ionized in any one of several ways, as by thermal ionization, electric field ionization, X-ray ionization, etc. Because of the relative ease and effectiveness with which it may be carried out, the preferred method used thus far in both closed and open cycle MHD generating systems is by thermal ionization, i.e., adding heat energy to the gas until some of the gas molecules lose electrons. The thermal ionization process is, however, severely temperature dependent, i.e., there is a threshold temperature range below which insufficient ionization takes place. The ionization energy, by which is meant the energy increment which must be added to the atoms or molecules to initiate ionization and tear loose one or more of its electrons, is quite high for most gases. Common gases, such as air, CO, $CO_2$, as well as noble gases, are only weakly ionized below 6000 to 7000° K. It will be appreciated that the problems involved in heating the gas to an operating temperature, which must be even higher than the ionization threshold temperature of 6000° K., are substantial both in terms of the magnitude of the effort required to heat the gas and in terms of the problem of finding materials capable of withstanding such temperatures.

Fortunately, these difficulties may be reduced by a technique which substantially lowers the critical threshold temperature for ionization. It has been found that by adding a small amount, in the range of 0.01–1% by volume, of some easily ionizable material, such as an alkali metal, for example, the threshold ionization temperature is reduced by as much as 60–70%.

For example, by "seeding" clean air through the addition of 1% or less by colume of potassium vapor, the critical ionization threshold temperature is reduced from 6000° K. to about 2000° K. (3600° R.). Cesium, rubidium, sodium, and lithium are additional examples of alkali metals which are effective for this purpose. Examples of compounds containing alkali metals are potassium carbonate ($K_2CO_3$) and cesium carbonate ($CsCO_3$).

The actual choice of seed material concentration must be determined by calculation and/or experimental tests for the specific conditions of each MHD generator in accordance with criteria which are taught by this invention. In most designs of practical interest, the ratio of seed material to working gas atomic concentration should be about 1% or less. For a more thorough discussion of electrical conductivity and ionization phenomena, reference is hereby made to the text "Introduction to the Theory of Ionized Gases" by J. L. Delcroix, Interscience Publishers, Inc., New York, 1960.

Broadly, the present invention contemplates introducing into a hot inert gas seeded with an alkali metal in MHD apparatus, other components which react with the seed material whereby energy resulting from such reaction is converted into ionization energy to effect ionization of said seed material.

In view of the foregoing, it will be apparent that it is a primary object of the present invention to provide a method and means for generating electrical power in MHD apparatus in which the degree of ionization is not dependent solely on the temperature to which the gaseous conducting medium is heated.

It is another object of the present invention to provide a method and means for providing practical values of conductivity in MHD apparatus wherein the temperature of the gaseous conducting medium is less than that heretofore considered necessary.

It is another object of the present invention to provide new and improved closed cycle MHD energy conversion apparatus.

A further object of the present invention is to provide a method and means for providing practical values of electrical conductivity in closed cycle MHD apparatus wherein an oxidizer and/or other components are introduced into the gaseous medium containing a seed material and react with the seed material, the energy of reaction being converted into ionization energy to effect ionization of the seed material or to form ions of low ionization potential.

It is a still further object of the present invention to provide a method and means for increasing the degree of ionization and for maintaining the ionization at practical levels of conductivity at gas temperature less than that heretofore considered necessary to produce thermal ionization of gaseous conducting mediums comprising a seeded but otherwise inert gas.

The novel features that are considered characteristic of the present invention are set forth in the appended claims; the invention itself, however, both as to its organization and method of operation, together with additional objects and advantages thereof, will best be understood from the following description of a specific embodiment, when read in conjunction with the accompanying drawings, in which:

Figure 1:
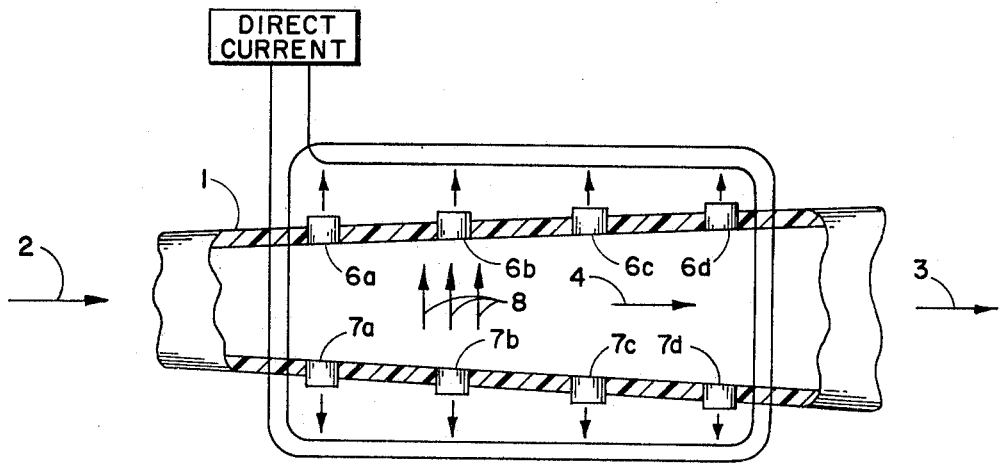
FIGURE 1 is a schematic illustration of a conventional MHD generator.

A knowledge of the general principles of MHD devices will promote an understanding of the present invention. For this reason and by way of example, there is shown in FIGURE 1 a schematic diagram of a prior art MHD generator. As illustrated in this figure, the generator comprises a tapered duct, generally designated 1, to which high temperature, high pressure, electrically conductive plasma is introduced, as indicated by the arrow at 2, and from which it exhausts, as indicated by the arrow at 3. The pressure at the exit of the duct is lower than at its inlet; and for this reason, the plasma moves at high velocity through the duct, as indicated by the arrow 4. By properly choosing the presure differential and shape of the duct, the plasma can be made to move through the duct at substantially constant velocity, which is desirable although not necessary to the operation of the generator. Surrounding the exterior of the duct is a continuous electrical conductor in the form of a coil 5 to which direct current may be supplied from any conventional source or from the generator itself. Flow of electrical current through the coil 5 establishes a magnetic flux through the duct 1 perpendicular to the direction of plasma flow 4 and the plane of the paper.

Within the duct are provided opposed electrodes 6a–6d and 7a–7d. These electrodes may extend along the interior of the duct parallel to the dominant direction of plasma movement and may be positioned opposite one another in planes perpendicular to the direction of plasma movement and parallel to the direction of magnetic flux. High velocity movement of the electrically conductive plasma through the magnetic field induces a unidirectional EMF between the electrodes, as indicated by the arrows at 8. The electrodes 6a–6d and 7a–7d may be connected by conductors to a load or loads (not shown) through which electrical current flows under the influence of the EMF induced between the electrodes.

For efficient operation and to maintain conductivity within the plasma, the elctrodes within the generator extend parallel to the dominant direction of plasma flow. In an MHD generator current is carried by the drift of electrons and ions relative to each other, the electrons, by virtue of their much smaller mass, doing most of the drifting. In most types of MHD generators, it is necessary for this current to flow from the plasma to the electrodes and then through the external load. The electrodes play much of the same part in an MHD generator as do the brushes in a conventional generator. In an MHD pump or accelerator, the current flows from an external source to the electrodes and through the fluid being pumped. If the electrodes are flush with the walls of the duct, the current of electrons and ions in the generator must of course flow through the aerodynamic boundary layer at the walls of the duct to reach them.

Figure 2:
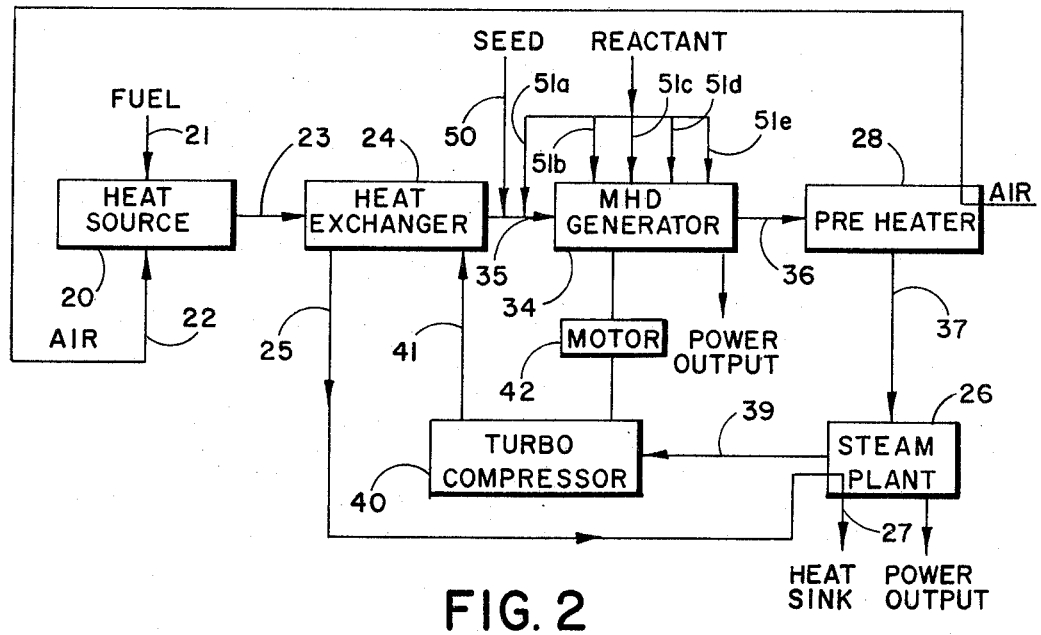
FIGURE 2 is a block diagram illustrating one embodiment of closed cycle MHD power generating system in accordance with the present invention.

Shown in block diagram form in FIGURE 2 is an embodiment of the present invention in which the plasma for the MHD generator circulates in a closed cycle, and in which fuel is burned in the combustion chamber in the presence of air, oxygen, or an oxygen-rich combustion supporting medium. Directing attention to that figure, it will be noted that the heat source is shown at 20. The heat source may be a conventional combustion chamber or a conventional nuclear heat source. Fuel is introduced to the combustion chamber at 21 and either air, oxygen or oxygen-rich medium for supporting combustion of the fuel is introduced at 22. High temperature combustion products from the combustion chamber are introduced at 23 to a heat exchanger 24. After extraction of heat in the heat exchanger, the combustion products are introduced at 25 to a conventional steam plant 26 and eventually exhaust to the atmosphere at 27. Before being introduced to the combustion chamber at 22, the air may be heated in preheater 28.

Attention may now be directed to the closed MHD cycle. An MHD generator 34 receives high temperature plasma at 35 and after extraction of energy therefrom discharges the plasma at 36 to the preheater 28. In the preheater 28 the plasma, now more aptly termed "working fluid," yields some of its heat to the air flowing to the combustion chamber and is thereafter introduced at 37 to steam plant 26. The steam plant includes heat exchangers (not shown) for extracting more heat from the working fluid before discharging the working fluid at 39 to a turbo-compressor 40. The turbo-compressor compresses the working fluid and supplied it at 41 to the heat exchanger 24 where it is reheated, completing the closed cycle. The steam plant 26 may drive turbo-compressor 40. A motor 42, deriving power from the MHD generator 34, may also be provided to aid in driving the turbo-compressor. Power from both the steam plant or the MHD generator may be used in conventional manner.

It will be noted from the foregoing description that the plasma for the MHD generator circulates in a closed system and is not contaminated by the high temperature fluid from the heat source 20. Although the closed system is characterized by the presence of a high temperature heat exchanger 24, it makes use of an inert gas plasma possible. Use of such a plasma in an open system would be prohibitive in cost, but in the closed system disclosed hereinabove in which none of the plasma is lost, expensive inert gases such as helium and argon can be used. The closed system has the additional benefit of preventing contamination of the MHD electrodes by slag from the combustion chamber.

Up to this point there has been described a conventional and well known MHD closed cycle system. In such prior art closed cycle systems, the plasma comprises seeded inert gas at the minimum temperature of about 3600° R. (2000° K.) required to thermally ionize the gas and provide the minimum conductivity of about one mho per meter more fully discussed hereinafter. It would be advantageous if this same or a greater electrical conductivity could be provided at more practical temperatures, i.e., gas temperature less than 2000° K.

The above is accomplished in accordance with the present invention by the introduction of seed into the gas upstream of the MHD generator and the introduction of a material reactive with the seed into the gas upstream of and/or within the magnetic field.

One method of and apparatus for reduction of the gas temperature is, as shown in FIGURE 2, to continuously introduce seed into the gas upstream of the MHD generator as at 50 and to simultaneously continuously introduce into the gas upstream and/or within the magnetic field, as at 51a–51e, a material such as oxygen that is chemically reactive with the seed. Thus as shown in FIGURE 2, a suitable supply source (not shown) of seed such as cesium may be connected at point 50 and a suitable supply source of a reactant connected at a plurality of points such as 51a–51e. Through a suitable orifice seed may be introduced into the gas upstream of the MHD generator and the reactant introduced into the seeded gas through suitable orifices in the duct so that ionization energy may be added to the seeded gas by chemical reaction to provide practical values of electrical conductivity within the magnetic field. In the above manner, practical values of electrical conductivity may be provided in gases having a maximum temperature (900°–1500° K.) substantially less than 2000° K.

Depending on the quantity of seed introduced, the type and purity of reactant would be determined. For example, if 0.1 to 1.0% of seed is introduced, not more than the same percent of oxygen may be introduced. However, the introduction of excess oxygen should be avoided because this leads to the formation of molecular species which exchange charges with the atomic ions, thereby leading to a fast recombination between electrons and ions. This results in a rapid disappearance of electron concentration and conductivity.

In MHD apparatus, the minimum useful conductivity of an electrically conductive plasma whether the seeded products of combustion or a seeded inert gas is of the order of one mho per meter. As pointed out hereinabove, such a conductivity requires a gas temperature of the order of about 2000° K. (3100° F.) in a seeded inert gas.

A heat exchanger is required for any closed cycle system and the seeded inert gas in prior art closed system must be heated to a temperature in excess of 3000° F. This means that the heat exchanger must operate at temperatures in excess of 3000° F. Such operating temperatures pose serious design problems and require the use of expensive materials, such as zirconia, in the heat exchanger. In a system for central power station use, large quantities of fluid would be employed and the heat exchanger would assume very large proportions. In addition, slag in combustion products may prove destructive to heat exchanger materials. Further, present day nuclear heat sources with high radioactive containment achieve a useful temperature of roughly only about 1500° F.

For these reasons, present day heat exchanger systems, although theoretically feasible, present serious economic and operational problems that may be avoided by the use of the present invention now to be described in detail.

In accordance with the present invention, an electrical conductivity in a seeded inert gas of the order of one mho per meter or more at about temperatures presently achieved by gas cooled reactors or within the state of the art for heat exchangers is achieved by the injection of a reactant such as, for example, oxygen, air, and the like, either upstream of, or within the duct through which flows inert gases such as argon or helium seeded with an alkali metal.

Reaction of a seed material such as cesium and a material reactive with cesium such as oxygen is strongly exothermic and fast. During the reaction of the alkali metal and the oxidizer, an appreciable amount of the energy is converted into ionization energy by processes such as:

$$Cs_2 + O_2 \rightarrow CsO_2 + Cs^+ + e$$

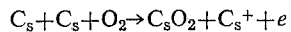
$$Cs + Cs + O_2 \rightarrow CsO_2 + Cs^+ + e$$

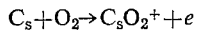
$$Cs + O_2 \rightarrow CsO_2^+ + e$$

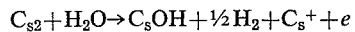
$$Cs_2 + H_2O \rightarrow CsOH + \tfrac{1}{2}H_2 + Cs^+ + e$$

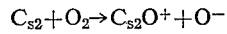
$$Cs_2 + O_2 \rightarrow Cs_2O^+ + O^-$$

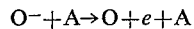
$$O^- + A \rightarrow O + e + A$$

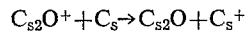
$$Cs_2O^+ + Cs \rightarrow Cs_2O + Cs^+$$

In the reaction zone, the conversion of the reaction energy into ionization energy drives the electron concentration in the magnetic field well above equilibrium. Downstream of the reaction zone, relaxation towards equilibrium occurs, but the recombination time is long compared to the residence time of the electrons in the duct. Accordingly, the electron concentration can be frozen at a concentration around $10^{12}$ electrons per cubic centimeter or more which yields a conductivity around one mho per meter or more.

In an MHD duct conveying seeded argon and in a shock tube also containing seeded argon both of which were operated in accordance with the present invention, electrical conductivities of one mho per meter were obtained.

In the aforementioned MHD duct, which had a flow area of 1.5 square inches, an argon-cesium flow was established. The flow of argon-cesium had a stagnation pressure of about 2.50 p.s.i.g. and a stagnation temperature of about 1000° C. The cesium flow rate was about 1 cc. per second. A constant voltage of about 40 volts was applied across the electrodes and under these conditions, a current flow of approximately 10–12 ma. was observed. At this point, air was injected at a pressure of 1–3 p.s.i.g. into the duct upstream of the electrodes. This resulted in a small increase in electrode current flow, but when the air pressure was increased to between 3–4 p.s.i.g., the electrode current increased to approximately 60 ma., thereby giving a factor of 5 increase in electrode current flow. When the air pressure was decreased to zero, the electrode current flow returned to its initial value of 10–12 ma.

If the oxidizer is injected upstream of the magnetic field, as at 51a in FIGURE 2, conductivity of about one mho per meter can be maintained throughout the channel at temperatures below 2000° K. However, if the oxidizer is injected along the length of the duct and within the magnetic field, as at 51b–51e in FIGURE 2, continuous reaction is realized and electrical conductivity in excess of one mho per meter may be obtained. The oxidizer such as, for example, oxygen may be introduced into the duct through small conventional injectors located in the duct walls and/or through injectors located in the main stream of the gas flow.

The present invention can be advantageously used in conjunction with joule heating of the electrons in the magnetic field. The combination of the present invention with joule heating results in electrical conductivity well in excess of one mho per meter. At low gas temperatures, i.e., less than 3100° F., absent the injection of a reactant in accordance with the present invention, the electron concentration in the gas is so small that the joule heating is smaller than the losses, mostly by radiation; hence, the electron temperature cannot be elevated. When the present invention is combined with joule heating of the electrons, the electron density is sufficiently high that the joule heating offsets the losses at gas temperatures below 3100° F.

Chemical ionization having small reaction zone, the present invention can be used to reduce the incubation length necessary to obtain the desired electron concentration by joule heating.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claim.

I claim:

The method of generating electrical power which comprises:
    (a) passing an inert gas through a flow channel disposed in a magnetic field and having electrode means along its length;
    (b) introducing a seeding material ionizable at a relatively low temperature into said gas upstream of said magnetic field, the molar concentration of said seeding material being small compared to that of said inert gas; and (c) introducing upstream of at least part of said magnetic field an oxidizer reactive with said seeding material whereby said oxidizer makes contact and reacts with said seeding material in the region of said magnetic field to at least in part ionize said seeding material by exothermic reaction therewith.

2. The method as defined in claim 1 wherein said seeding material is cesium and said seeding material reactant includes oxygen.

3. The metthod as defined in claim 1 wherein said seeding material is an alkali metal and the maximum temperature of said gas in the region of said magnetic field is less than that required to substantially ionize said alkali metal.

4. Magnetohydrodynamic apparatus including:
 (a) means for supplying a hot inert gas;
 (b) duct means for flow of said gas through the generator;
 (c) means for providing in the duct means a magnetic field transverse to the flow of gas;
 (d) electrode means disposed along the length of said duct and in said magnetic field;
 (e) means for seeding said gas with an alkali metal; and
 (f) means including means for introducing into said gas and into contact with said seed a material reactive with said seed for effecting a reaction between the reactive material and the seed in the gas during its passage through the magnetic field to maintain the gas at a relatively high level of electrical conductivity.

5. The combination as defined in claim 4 wherein said reactive material is an oxidizer and is introduced upstream of at least part of said magnetic field.

6. The combination as defined in claim 4 wherein said reactive material is oxygen and said oxygen is introduced at a plurality of points along the duct means to effect substantially continuous reaction between said oxygen and seed in said gas throughout its passage through the magnetic field.

7. The combination as defined in claim 4 wherein the temperature of said inert gas in said magnetic field is less than that required to substantially ionize said alkali metal.

References Cited

UNITED STATES PATENTS 3,170,077  2/1965  Blackman et al. _____ 310—11
3,356,871  12/1967  Hundstad _____ 310—11

DAVID X. SLINEY, Primary Examiner